(12) United States Patent
Seo et al.

(10) Patent No.: US 8,577,919 B2
(45) Date of Patent: Nov. 5, 2013

(54) METHOD AND APPARATUS FOR RETRIEVING MULTIMEDIA CONTENTS

(75) Inventors: Hee-Cheol Seo, Daejon (KR); Mi-Ran Choi, Daejon (KR); Hyun-Ki Kim, Daejon (KR); Myung-Gil Jang, Daejon (KR); Jeong Heo, Daejon (KR); Soo-Jong Lim, Daejon (KR); Yeo-Chan Yoon, Seoul (KR); Kyoung-Ro Yoon, Seoul (KR)

(73) Assignees: Electronics And Telecommunications Research Institute (KR); Konkuk University Industrial Cooperation Corp (KR)

( * ) Notice: Subject to any disclaimer, the term of this patent is extended or adjusted under 35 U.S.C. 154(b) by 493 days.

(21) Appl. No.: 12/597,158

(22) PCT Filed: Apr. 23, 2008

(86) PCT No.: PCT/KR2008/002285
§ 371 (c)(1),
(2), (4) Date: Oct. 22, 2009

(87) PCT Pub. No.: WO2008/130182
PCT Pub. Date: Oct. 30, 2008

(65) Prior Publication Data
US 2010/0131557 A1    May 27, 2010

(30) Foreign Application Priority Data

Apr. 23, 2007 (KR) ......................... 10-2007-0039475
Apr. 18, 2008 (KR) ......................... 10-2008-0035896

(51) Int. Cl.
*G06F 17/30* (2006.01)
(52) U.S. Cl.
USPC ............... 707/778; 707/758; 706/11; 706/14; 706/45

(58) Field of Classification Search
None
See application file for complete search history.

(56) References Cited

U.S. PATENT DOCUMENTS 6,070,167 A * 5/2000 Qian et al. ........................... 1/1
6,411,724 B1 * 6/2002 Vaithilingam et al. ........ 382/100
(Continued)

FOREIGN PATENT DOCUMENTS

CN    1396770       2/2003
CN    1815612 A     8/2006
(Continued)

OTHER PUBLICATIONS
Doller et al, "Towards an MPEG-7 Query Language", University Passau, 2006.*

(Continued)

*Primary Examiner* — Hung Le
(74) *Attorney, Agent, or Firm* — Blakely Sokoloff Taylor & Zafman (57) ABSTRACT

Disclosed is an apparatus and method for retrieving multimedia contents represented in a Moving Picture Experts Group (MPEG) 7 by transforming a user query into an MPEG-7 query format. The method for retrieving multimedia contents includes: representing a user query by using an indicator indicating a specific region of a Moving Picture Experts Group 7 (MPEG-7) document and a reference for referring to the indicator; analyzing a meaning of the user query represented by using the indicator and the reference to thereby produce an analysis result; and retrieving multimedia contents according to the analysis result. The present research can satisfy more than two retrieval conditions within the same structure in an MPEG-7 query format and it can also clearly represent that two different MPEG-7 documents are referred to. Since the meaning of a user query is analyzed accurately during retrieval process, it is possible to precisely retrieve multimedia contents.

15 Claims, 6 Drawing Sheets

(56) References Cited

U.S. PATENT DOCUMENTS

| | | | |
|---|---|---|---|
| 6,490,370 B1* | 12/2002 | Krasinski et al. | 382/195 |
| 6,593,936 B1* | 7/2003 | Huang et al. | 345/619 |
| 6,629,088 B1* | 9/2003 | Rising, III | 706/12 |
| 6,961,446 B2* | 11/2005 | Imagawa et al. | 382/103 |
| 7,231,394 B2* | 6/2007 | Walker et al. | 1/1 |
| 7,624,326 B2* | 11/2009 | Watanabe et al. | 714/752 |
| 7,664,830 B2* | 2/2010 | Rising, III | 709/218 |
| 2002/0063718 A1* | 5/2002 | Choi et al. | 345/581 |
| 2004/0205510 A1* | 10/2004 | Rising, III | 715/501.1 |
| 2004/0267720 A1* | 12/2004 | Liu et al. | 707/3 |
| 2006/0112124 A1 | 5/2006 | Ando et al. | |
| 2006/0153537 A1* | 7/2006 | Kaneko et al. | 386/95 |
| 2007/0233673 A1 | 10/2007 | Seo et al. | |

FOREIGN PATENT DOCUMENTS

| | | |
|---|---|---|
| EP | 1 276 327 A2 | 1/2003 |
| JP | 2005-501343 A | 1/2005 |
| KR | 10-2001-0092899 | 10/2001 |
| KR | 10-2002-0006623 A | 1/2002 |
| KR | 10-2005-0043901 A | 5/2005 |
| KR | 10-2005-0066790 A | 6/2005 |
| WO | WO 2004/023341 A1 | 3/2004 |
| WO | WO 2006/009768 A1 | 1/2006 |

OTHER PUBLICATIONS

Fatemi et al, "How to retrieve multimedia documents described by MPEG-7", Switzerland, 2004.*

Martinez et al, "MPEG-7: the generic Multimedia Content Description Standard", IEEE, 2002.*

Liu et al, "Queries of Digital Content Descriptions in MPEG-7 and MPEG-21 XML documents", 2002.*

Mamou et al, "A Query Language for Multimedia Content", ACM, 2007.*

Nack et al, "Everything You Wanted to Know About MPEG-7: Part 2", IEEE, 1999.*

Westermann et al, "An Analysis of XML Database Solutions for the Management of MPEG-7 Media Descriptions", ACM, 2003.*

Ndjiki-Nya et al, "Video Content Analysis Using MPEG-7 Descriptors", Heinrich-Hertz-Institut, Germany, 2004.*

Seo, H.-C., et al., "Revision of Proposed Input Query Format for MPEG-7 Query Format," Joint Video Team (JVT) of ISO/IEC MPEG & ITU-T VCEG (ISO/IEC JTC1/SC29/WG11 and ITU-T SG16 Q6), No. M14421 (Apr. 18, 2007), 32 pages.

Seo, H.-C., et al., "CE Report for Query Expression of MPEG-7 Query Format," Joint Video Team (JVT) of ISO/IEC MPEG & ITU-T VCEG (ISO/IEC JTC1/SC29/WG11 and ITU-T SG16 Q6), No. M14420 (Apr. 18, 2007), 29 pages.

K. Adistambha et al., "The MPEG-7 Query Format: A New Standard in Progress for Multimedia Query by Content," *ISCIT* 2007, Oct. 17-19, 2007, pp. 479-484.

N. Fatemi et al., "An XQuery Adaptation for MPEG-7 Documents Retrieval," *XML Conference & Exposition,* Dec. 2003, pp. 1-9.

Ji-Hoon Kang et al., "An XQuery engine for digital library systems that support XML data," *Proceedings of the 2004 International Symposium on Applications and the Internet Workshops,* Jan. 2004, pp. 255-259.

Sun, Y., et al., "Content-Based Multimedia Retrieval Model Based MPEG-7 Standard," *Mini-Micro Systems,* vol. 25, No. 3, Mar. 2005, China Academic Journal Electronic Publishing House, pp. 470-473.

Shi, L. et al., "A Semantic Image Retrieval System Based on MPEG-7," *Telecommunicanons for Electric Power System*, vol. 26, No. 156, Oct. 10, 2005, China Academic Journal Electronic Publishing House, pp. 10-13.

Melton, J., et al., "XML Syntax for XQuery 1.0 (XQueryX)," W3C Recommendation, Jan. 23, 2007, http://www.w3.org/TR/2007/REC-xqueryx-20070123, pp. 1-98.

* cited by examiner

METHOD AND APPARATUS FOR RETRIEVING MULTIMEDIA CONTENTS

This is a non-provisional application claiming the benefit of International application number PCT/KR2008/002285 filed Apr. 23, 2008.

TECHNICAL FIELD

The present invention relates to an apparatus and method for retrieving multimedia contents; and, more particularly, to multimedia contents retrieving apparatus that can retrieve multimedia contents represented based on Moving Picture Experts Group 7 (MPEG-7) by transforming a user query into an MPEG-7 query format, and a method thereof.

This work was supported by the IT R&D program of MIC/IITA [2005-S-117-03, "Development of Intelligent Personal Media Managing Technology for Ubiquitous Environment"].

BACKGROUND ART

Moving Picture Experts Group 7 (MPEG-7) is an international standardization on the architectures of metadata representing multimedia information, such as image, audio and moving picture. An MPEG-7 query format is used to retrieve multimedia contents represented based on the MPEG-7. An MPEG-7 multimedia contents retrieving system retrieves multimedia contents related to a query inputted in an MPEG-7 query format.

The MPEG-7 query format defines syntaxes for retrieving MPEG-7 documents. The syntaxes can represent diverse types of queries that can be used for the retrieval of MPEG-7 documents. For example, they can represent not only natural sentence-type query such as "an image with mountain" but also example-based query using a multimedia file as a query and MPEG-7 textual description-based query.

While representing such diverse queries, referring to the same or different portions of an MPEG-7 document occurs frequently. To be specific, there is a case where more than one retrieval condition should be all satisfied in the same structure. For example, to retrieve moving picture segments with "mountain" and "sea", the presence of "mountain" and "sea" could be represented for one region. As for joint operation, two different MPEG-7 documents should be referred to. For this, it should be clearly represented that two different documents are referred to.

Conventional MPEG-7 query formats may satisfy more than two retrieval conditions within the same architecture, but they have a shortcoming that they cannot clearly represent reference to two different MPEG-7 documents.

DISCLOSURE

Technical Problem

An embodiment of the present invention, which is invented to resolve the problem, is directed to providing a Moving Picture Experts Group 7 (MPEG-7) query format that can satisfy more than two retrieval conditions within the same structure and clearly represent that different MPEG-7 documents are referred to.

Another embodiment of the present invention is directed to providing an apparatus and method that can accurately retrieve multimedia contents by precisely analyzing the meaning of a user query in a retrieving process.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for retrieving multimedia contents, which includes: representing a user query by using an indicator indicating a specific region of a Moving Picture Experts Group 7 (MPEG-7) document and a reference for referring to the indicator; analyzing a meaning of the user query represented by using the indicator and the reference to thereby produce an analysis result; and retrieving multimedia contents according to the analysis result.

In accordance with another aspect of the present invention, there is provided a method for processing a user query to retrieve multimedia contents, which includes: receiving a query for retrieving multimedia contents from a user; representing the user query by using an indicator for indicating a specific region of an MPEG-7 document and a reference for referring to the indicator.

In accordance with another aspect of the present invention, there is provided an apparatus for retrieving multimedia contents, which includes: a query input unit for receiving a query for retrieving multimedia contents from a user; a query representation unit for representing the user query inputted through the query input unit by using an indicator for indicating a specific region of an MPEG-7 document and a reference for referring to the indicator; a query analysis unit for analyzing a meaning of the user query represented in the query representation unit by using the indicator and the reference to thereby produce an analysis result; and a contents retrieval unit for retrieving multimedia contents according to the analysis result.

In accordance with another aspect of the present invention, there is provided a data structure for representing a user query to retrieve multimedia contents, which includes: an indicator for indicating a specific region of an MPEG-7 document; and a reference for referring to the indicator.

Advantageous Effects

The present invention described above provides an MPEG-7 query format that can satisfy more than two retrieval conditions within the same structure and clearly represent that different MPEG-7 documents are referred to. Also, since the meaning of a user query is precisely analyzed during a retrieving process, it is possible to retrieve multimedia contents that accurately agree with the user query.

BEST MODE

The advantages, features and aspects of the invention will become apparent from the following description of the embodiments with reference to the accompanying drawings, which is set forth hereinafter. When it is considered that detailed description on a related art may obscure a point of the present invention, the description will not be provided herein. Hereinafter, specific embodiments of the present invention will be described with reference to the accompanying drawings.

Figure 1:
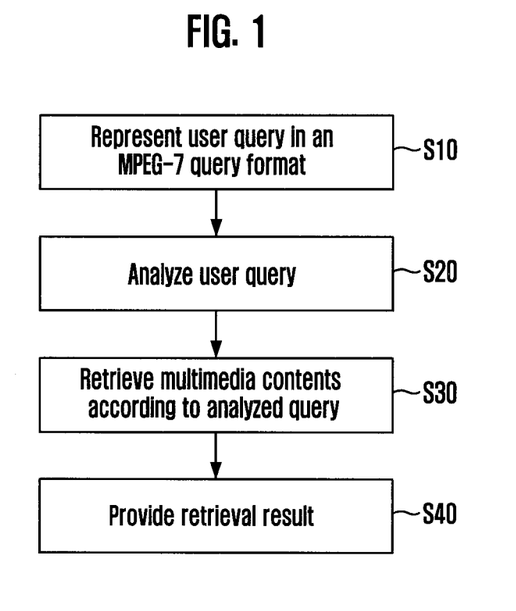
FIG. 1 is a flowchart describing a multimedia contents retrieving method in accordance with an embodiment of the present invention.

FIG. 1 is a flowchart describing a multimedia contents retrieving method in accordance with an embodiment of the present invention.

In step S10, a user query is represented as a query for retrieving multimedia contents. The user query is represented using an indicator and a reference for referring to the indicator to precisely represent the meaning of the user query. The indicator denotes a specific region of a Moving Picture Experts Group 7 (MPEG-7) document, and the reference is used to refer to the indicator. For example, when moving picture segments with "mountain" and "sea" is retrieved for, there is an indicator for a moving picture segment and a reference of the indicator may represent the presence of "mountain" and another reference, the presence of "sea." In subsequent joint operation, two indicators may be established for two different MPEG-7 documents, respectively, and each of the two indicators may have references to clearly represent the two different MPEG-7 documents from each other.

In step S20, a query processor analyzes the user query represented using the indicator and references. In step S30, a retrieval engine retrieves multimedia contents related to the user query analyzed in the query processor and, in step S40, provides a retrieval result.

Figure 2:
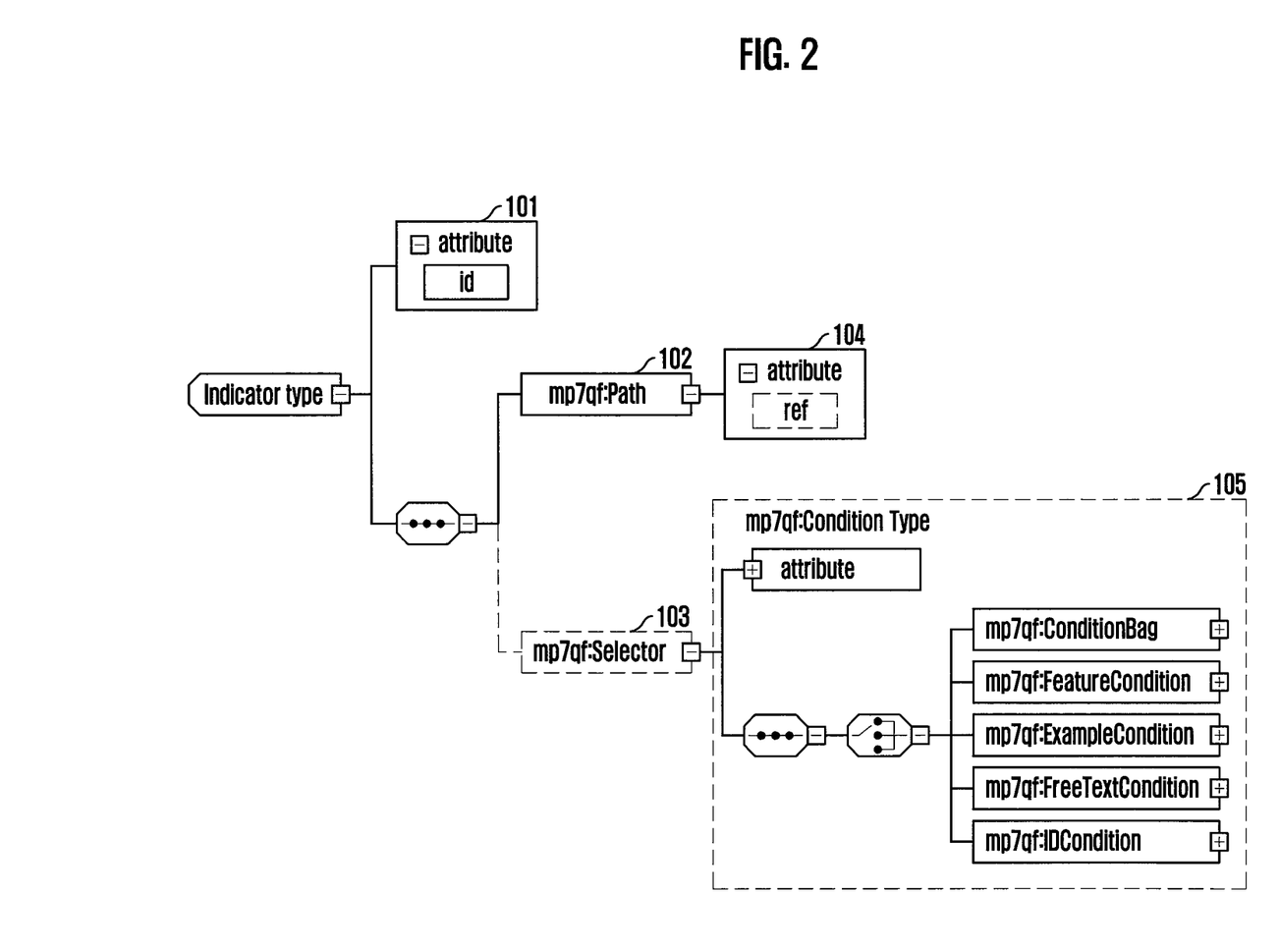
FIG. 2 illustrates an eXtensible Markup Language (XML) schema of an indicator in accordance with an embodiment of the present invention.

FIG. 2 illustrates an eXtensible Markup Language (XML) schema of an indicator in accordance with an embodiment of the present invention. As shown in the drawing, an indicator includes an indicator identification (ID) number 101, an indicator region descriptor 102, and an indicator limiting descriptor 103. The indicator region descriptor 102 may include a reference 104 for referring to another indicator. The indicator limiting descriptor 103 includes a part 105 describing conditions for limiting an indicator.

An MPEG-7 document is described in an XML format, and an indicator indicates a specific region of the MPEG-7 document. For this, the indicator region descriptor 102 is used to designate an uppermost node of the specific region. The indicator limiting descriptor 103 is used when an additional limiting condition is needed in connection with a region represented by indicator region descriptor. The indicator ID number 101 is used when an indicator is referred to.

The following Table 1 shows FIG. 2 described in the format of an XML schema. In the Table 1, a "path" element is a part for describing an indicator region, and a "selector" element is a part for describing limitation of an indicator. The "id" denotes the unique number of an indicator. To allow referring to other indicators within an indicator, a "ref" attribute is used. In a part limiting an indicator, "ConditionalType" is defined as a limiting condition to describe specific condition.

TABLE 1

```
<complexType name="IndicatorType">
    <sequence>
        <element name="Path">
            <complexType>
                <simpleContent>
                    <extension base="mpeg7:xPathType">
                        <attribute name="ref" type="IDREF"
                            use="optional"/>
                        <extension>
                    </simpleContent>
            </complexType>
        </element>
        <element name="Selector" type="mp7qf:ConditionType"
            minOccurs="0"/>
    </sequence>
    <attribute name="id" type="ID" use="required"/>
</complexType>
```

Figure 3:
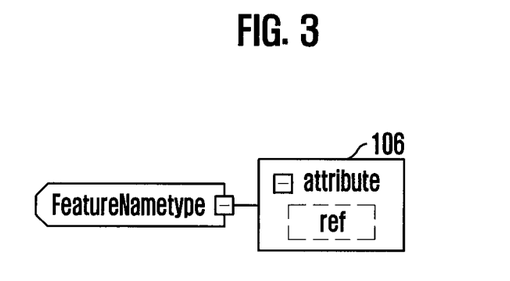
FIG. 3 illustrates an XML schema of a reference in accordance with an embodiment of the present invention.

FIG. 3 illustrates an XML schema of a reference in accordance with an embodiment of the present invention. An indicator may refer to a specific indicator, and it is possible to refer to a node inside a specific region which is indicated by the indicator.

In FIG. 3, an indicator may include a "ref" attribute for referring to a specific indicator, and represent a region related to the indicator by the attribute value. XML schema related to FIG. 3 may be described as the following Table 2, where the "ref" attribute refers to the indicator and "xPathType" describes a part related to the indicator.

TABLE 2

```
<complexType name="FeatureNameType">
    <simpleContent>
        <extension base="mpeg7:xPathType">
            <attribute name="ref" type="IDREF" use="optional"/>
        </extension>
    </simpleContent>
</complexType>
```

Figure 4:
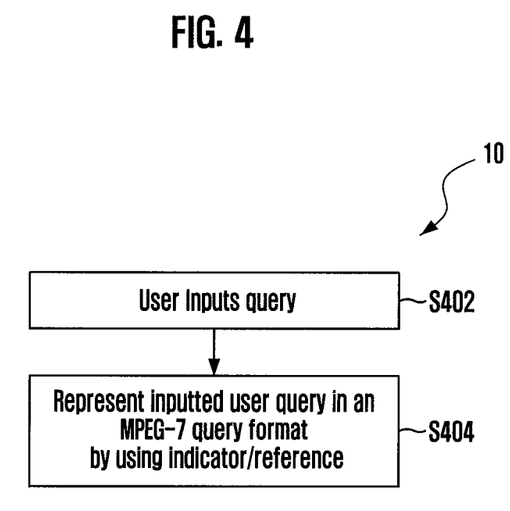
FIG. 4 is a flowchart describing a query representation step S10 of FIG. 1 in detail.

FIG. 4 is a flowchart describing a query representation step S10 of FIG. 1 in detail. In step S402, a query for retrieving multimedia contents is inputted from a user. In step S404, the inputted user query is represented as an indicator for indicating a specific region of an MPEG-7 document and a reference for referring to the indicator.

For example, a query for "retrieving images whose horizontal length×vertical length is greater than 1024×768" can be represented as the following Table 3 based on the XML schema defined in the Tables 1 and 2. In the Table 3, an indicator is referred to by using a reference "href," and a specific part related to a region indicated by the indicator can be indicated by describing an additional path.

TABLE 3

```
<mp7qf:RetrieveData>
    <mp7qf:Indicator id="M7DocID">
        <mp7qf:Path>/Mpeg7</mp7qf:Path>
    </mp7qf:Indicator>
    <mp7qf:Indicator id="VisualCodingFrameID">
```

TABLE 3-continued

```
        <mp7qf:Path ref="M7DocID">//VisualCoding/Frame</mp7qf:Path>
    </mp7qf:Indicator>
    <mp7qf:Condition>
        <mp7qf:ConditionBag operator="AND">
            <!-- target content : Image -->
            <mp7qf:FeatureCondition operator="equalTo">
                <mp7qf:SourceFeature ref="M7DocID">
                    //MediaFormat/Content/Name
                </mp7qf:SourceFeature>
                <mp7qf:TargetConstantValue xsi:type="mp7qf:FeatureStringType">
                    <mp7qf:value>Image</mp7qf:value>
                </mp7qf:TargetConstantValue>
            </mp7qf:FeatureCondition>
            <!-- sizes are greater than or equal to 1024*768 pixels (width * height) -->
            <mp7qf:FeatureCondition operator="greaterThanOREqualTo">
                <mp7qf:SourceFeatureExpression operator="multiply">
                    <mp7qf:FeatureName ref="VisualCodingFrameID">
                        @height
                    </mp7qf:FeatureName>
                    <mp7qf:FeatureName ref="VisualCodingFrameID">
                        @width
                    </mp7qf:FeatureName>
                </mp7qf:SourceFeatureExpression>
                <mp7qf:TargetFeatureExpression operator="multiply">
                    <mp7qf:ConstantValue xsi:type="mp7qf:FeatureDecimalType">
                        <mp7qf:value>1024</mp7qf:value>
                    </mp7qf:ConstantValue>
                    <mp7qf:ConstantValue xsi:type="mp7qf:FeatureDecimalType">
                        <mp7qf:value>768</mp7qf:value>
                    </mp7qf:ConstantValue>
                </mp7qf:TargetFeatureExpression>
            </mp7qf:FeatureCondition>
        </mp7qf:ConditionBag>
    </mp7qf:Condition>
</mp7qf:RetrieveData>
```

Figure 5:
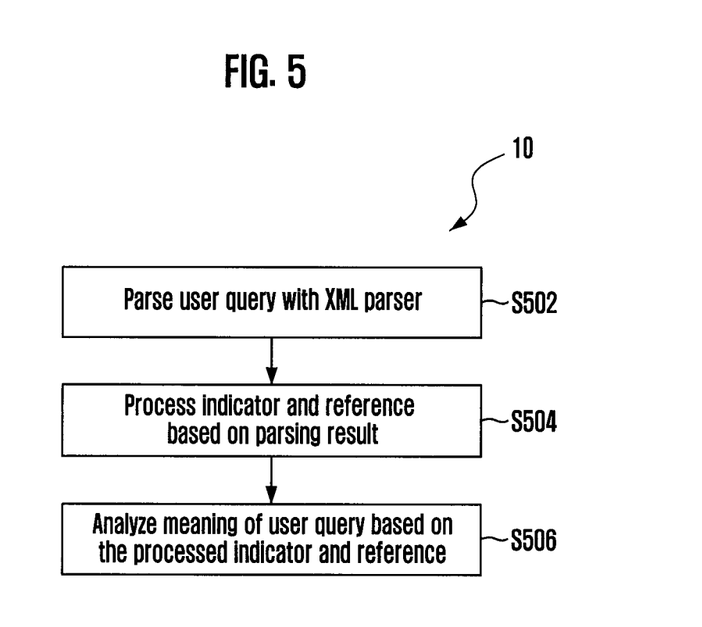
FIG. 5 is a flowchart describing a query processing step S20 of FIG. 1 in detail.

FIG. 5 is a flowchart describing a query processing step S20 of FIG. 1 in detail. The meaning of the user query represented using an indicator and a reference is analyzed in the query processing step S20. First, in step S502, an XML parser parses a user query described in an XML format. Subsequently, in step S504, the indicator and the reference are processed based on a parsing result. In step S506, the meaning of the user query is analyzed using the processed indicator and reference.

In the step S504 where the indicator and the reference are processed, references referring to the same indicator are regarded as values for referring to a value in the inside of the same region to analyze the meaning of the user query. For example, since "@height" and "@width" refer to "VisualCodingFrameID" in the user query, it is analyzed that the two refer to a value in the inside a region indicated by the "VisualCodingFrameID."

Figure 6:
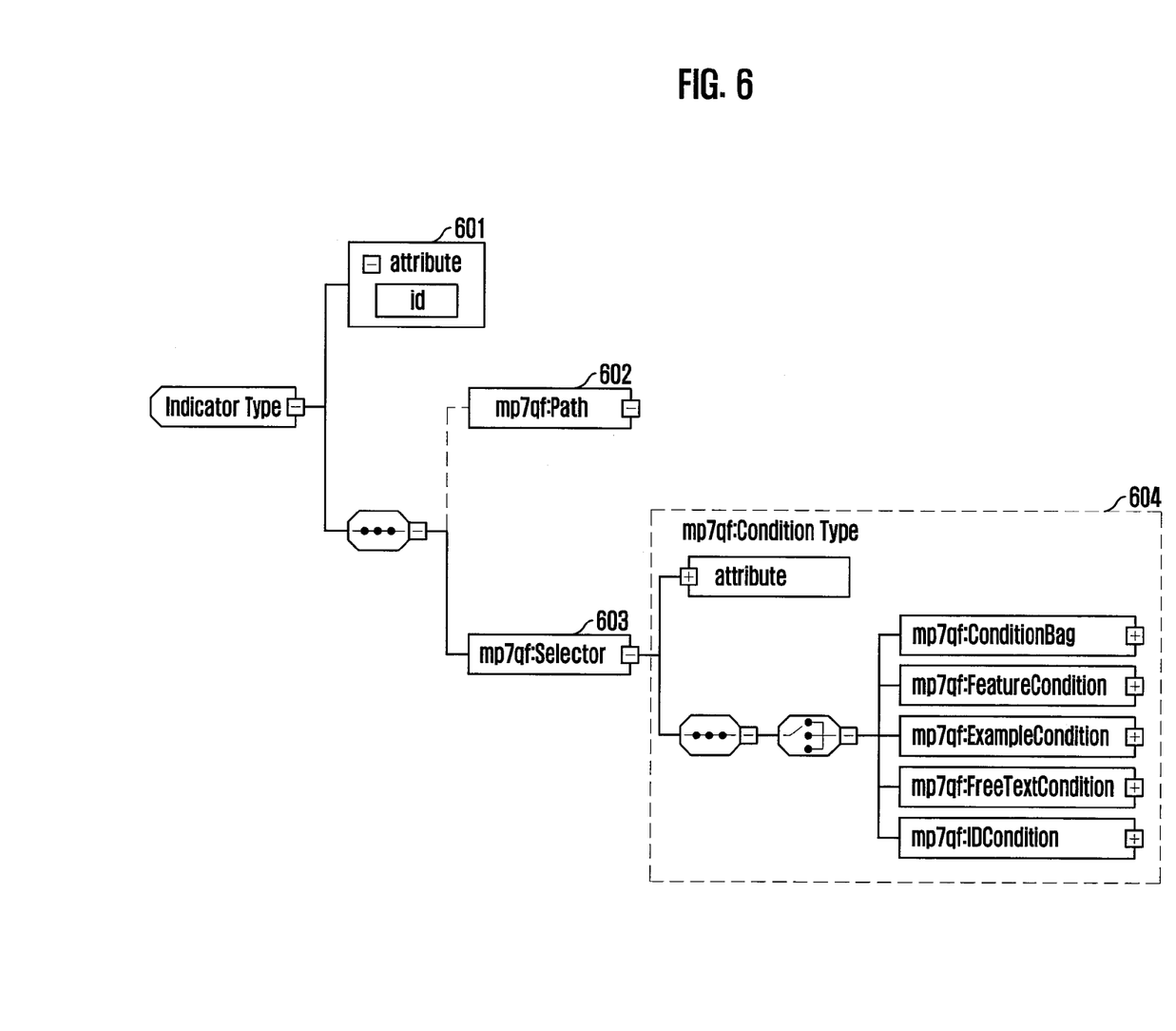
FIG. 6 illustrates an XML schema of an indicator in accordance with another embodiment of the present invention.

FIG. 6 illustrates an XML schema of an indicator in accordance with another embodiment of the present invention. An indicator ID number 601 is the same as the indicator ID number 101 of FIG. 2. An indicator region descriptor of FIG. 6 is an optional element whereas an indicator limiting descriptor 603 is essential element, and it does not have "attribute." FIG. 6 may be described in an XML schema, which is presented in the following Table 4.

TABLE 4

```
<mp7qf:RetrieveData>
    <mp7qf:Indicator id="M7DocID">
        <mp7qf:Path>/Mpeg7</mp7qf:Path>
    </mp7qf:Indicator>
    <mp7qf:Indicator id="VisualCodingFrameID">
        <mp7qf:Path ref="M7DocID">//VisualCoding/Frame</mp7qf:Path>
    </mp7qf:Indicator>
    <mp7qf:Condition>
        <mp7qf:ConditionBag operator="AND">
            <!-- target content : Image -->
            <mp7qf:FeatureCondition operator="equalTo">
                <mp7qf:SourceFeature ref="M7DocID">
                    //MediaFormat/Content/Name
                </mp7qf:SourceFeature>
                <mp7qf:TargetConstantValue xsi:type="mp7qf:FeatureStringType">
                    <mp7qf:value>Image</mp7qf:value>
                </mp7qf:TargetConstantValue>
            </mp7qf:FeatureCondition>
            <!-- sizes are greater than or equal to 1024*768 pixels (width * height) -->
            <mp7qf:FeatureCondition operator="greaterThanOREqualTo">
                <mp7qf:SourceFeatureExpression operator="multiply">
                    <mp7qf:FeatureName ref="VisualCodingFrameID">
                        @height
```

TABLE 4-continued

```
            </mp7qf:FeatureName>
            <mp7qf:FeatureName ref="VisualCodingFrameID">
                @width
            </mp7qf:FeatureName>
        </mp7qf:SourceFeatureExpression>
        <mp7qf:TargetFeatureExpression operator="multiply">
            <mp7qf:ConstantValue xsi:type="mp7qf:FeatureDecimalType">
                <mp7qf:value>1024</mp7qf:value>
            </mp7qf:ConstantValue>
            <mp7qf:ConstantValue xsi:type="mp7qf:FeatureDecimalType">
                <mp7qf:value>768</mp7qf:value>
            </mp7qf:ConstantValue>
        </mp7qf:TargetFeatureExpression>
      </mp7qf:FeatureCondition>
    </mp7qf:ConditionBag>
  </mp7qf:Condition>
</mp7qf:RetrieveData>
```

Figure 7:
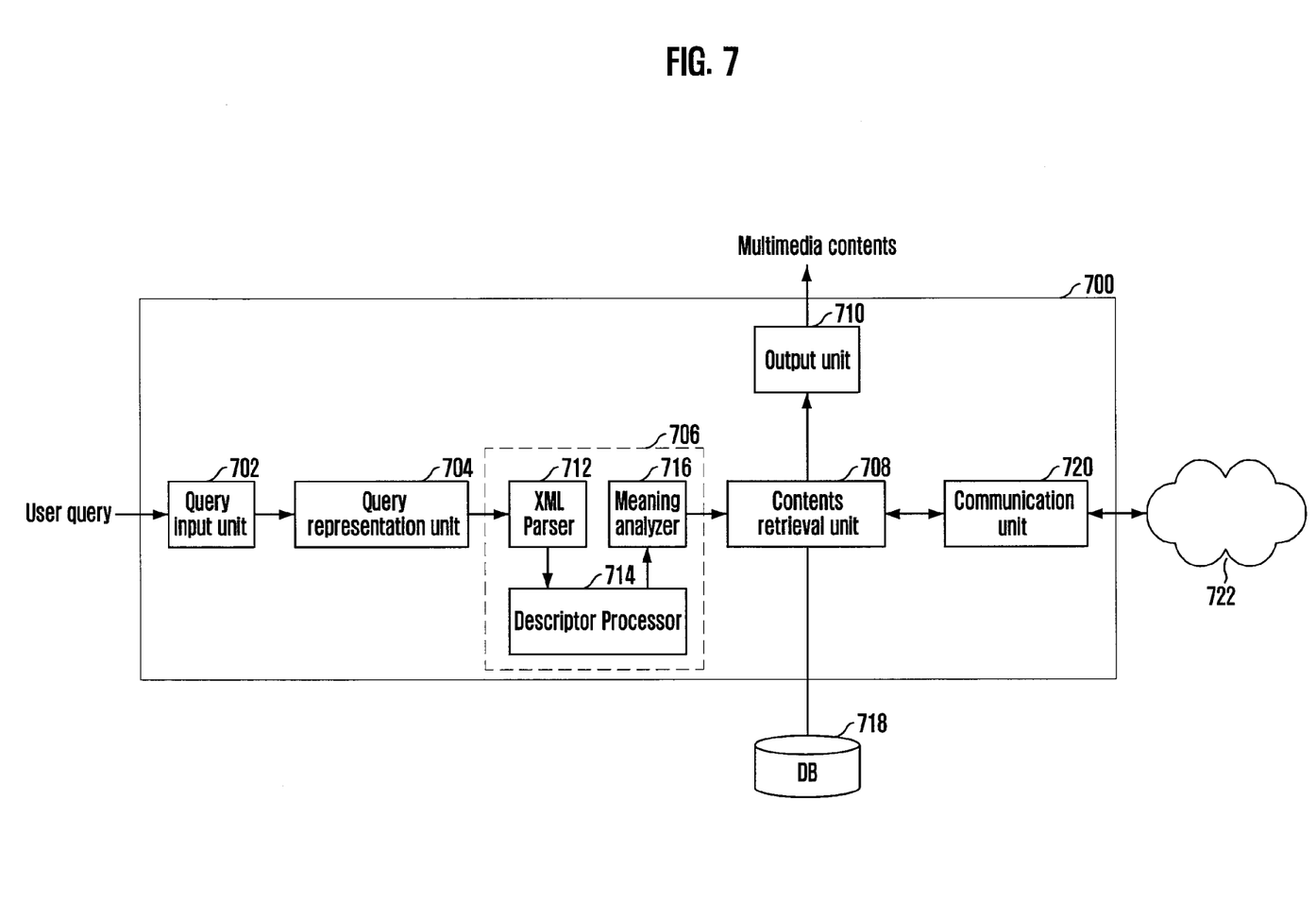
FIG. 7 is a block view showing a structure of multimedia contents retrieving apparatus in accordance with an embodiment of the present invention.

FIG. 7 is a block view showing a structure of multimedia contents retrieving apparatus in accordance with an embodiment of the present invention. As shown in the drawing, the multimedia contents retrieving apparatus 700 includes a query input unit 702, a query representation unit 704, a query analysis unit 706, a contents retrieval unit 708, and an output unit 710.

The query input unit 702 receives a query for retrieving multimedia contents from a user. The query representation unit 704 represents the user query inputted through the query input unit 702 into an MPEG-7 query format by using an indicator indicating a specific region of an MPEG-7 document and a reference for referring to the indicator. An indicator includes an indicator ID number used for a reference to refer to the indicator, a descriptor for describing limiting conditions for the region indicated by the indicator, and a descriptor for designating an uppermost node of the region indicated by the indicator. The user query is represented in an XML format.

The query analysis unit 706 analyzes the meaning of the user query represented using the indicator and the reference in the query representation unit 704. The query analysis unit 706 includes an XML parser 712 for parsing a user query, a descriptor processor 714 for processing an indicator and a reference based on the parsing result of the XML parser 712, and a meaning analyzer 716 for analyzing the meaning of the user query based on the indicator and the reference processed in the descriptor processor 714. The contents retrieval unit 708 retrieves multimedia contents according to the analysis result of the user query analysis unit 706. The contents retrieval unit 708 may retrieve a database 718 or search the internet 722 through a communication unit 720. The database 718 may be set up inside or outside the multimedia contents retrieving apparatus 700. The output unit 710 provides multimedia contents retrieved by the contents retrieval unit 708 to the user.

MODE FOR THE INVENTION

The method of the present invention described above may be realized as a program and stored in a computer-readable recording medium, such as CD-ROM, RAM, ROM, floppy disks, hard disks, magneto-optical disks and the like. Since this process can be easily implemented by those skilled in the art to which the present invention belongs, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A method for retrieving multimedia contents, comprising:
   representing a user query by using an indicator indicating a specific region of a Moving Picture Experts Group 7 (MPEG-7) document and a reference for referring to the indicator;
   analyzing a meaning of the user query represented by using the indicator and the reference to thereby produce an analysis result; and
   retrieving multimedia contents according to the analysis result,
   wherein the indicator includes:
      an indicator identification (ID) code used for the reference to refer to the indicator,
      an indicator region descriptor for describing the region indicated by the indicator, and
      an indicator limiting descriptor for describing a condition limiting the region indicated by the indicator.

2. The method of claim 1, wherein the indicator: region descriptor designates an uppermost node of the region indicated by the indicator.

3. The method of claim 1, wherein the user query is described in an eXtensible Markup Language (XML) format in the representing a user query by using an indicator and a reference.

4. The method of claim 3, wherein the analyzing a meaning of the user query represented by using the indicator and the reference includes:
   parsing the user query by using an XML parser to thereby produce a parsing result;
   processing the indicator and the reference based on the parsing result; and
   analyzing a meaning of the user query by using the processed indicator and reference.

5. The method of claim 4, wherein in the processing the indicator and the reference, a value inside a same region is referred to for references referring to a same indicator.

6. A method for processing a user query to retrieve multimedia contents, comprising:
   receiving a query for retrieving multimedia contents from a user;
   representing the user query by using an indicator for indicating a specific region of an MPEG-7 document and a reference for referring to the indicator, wherein the indicator includes:
an indicator ID code used for the reference to refer to the indicator,
an indicator region descriptor for describing the region indicated by the indicator, and
an indicator limiting descriptor for describing a condition limiting the region indicated by the indicator.

7. The method of claim 6, wherein the indicator region descriptor for designating designates an uppermost node of the region indicated by the indicator.

8. The method of claim 6, wherein the user query is described in an XML format in the representing a user query by using an indicator and a reference.

9. An apparatus for retrieving multimedia contents, comprising:
a hardware query input unit for receiving a query for retrieving multimedia contents from a user;
a query representation unit for representing the user query inputted through the query input unit by using an indicator for indicating a specific region of an MPEG-7 document and a reference for referring to the indicator;
a query analysis unit for analyzing a meaning of the user query represented in the query representation unit by using the indicator and the reference to thereby produce an analysis result; and
a contents retrieval unit for retrieving multimedia contents according to the analysis result,
wherein the indicator includes:
an indicator ID code used for the reference to refer to the indicator,
an indicator region descriptor for describing the region indicated by the indicator, and
an indicator limiting descriptor for describing a condition limiting the region indicated by the indicator.

10. The apparatus of claim 9, wherein the indicator region descriptor designates an uppermost node of the region indicated by the indicator.

11. The apparatus of claim 9, wherein the user query is described in an XML format in the query representation unit.

12. The apparatus of claim 11, wherein the query analysis unit includes:
an XML parser for parsing the user query to thereby produce a parsing result; a descriptor processor for processing the indicator and the reference based on the parsing result of the XML parser;
a meaning analyzer for analyzing a meaning of the user query by using the processed indicator and reference which are obtained in the descriptor processor.

13. A non-transitory computer-readable storage medium having stored thereon a data structure for representing a user query to retrieve multimedia contents, the data structure comprising:
an indicator for indicating a specific region of an MPEG-7 document; and
a reference for referring to the indicator, wherein the indicator includes:
an indicator ID code used for the reference to refer to the indicator,
an indicator region descriptor for describing the region indicated by the indicator, and
an indicator limiting descriptor for describing a condition limiting the region indicated by the indicator.

14. The non-transitory computer-readable storage medium of claim 13, wherein the indicator region descriptor for designating designates an uppermost node of the region indicated by the indicator.

15. The non-transitory computer-readable storage medium of claim 13, wherein the data structure is described in an XML format.

* * * * *